United States Patent [19]
Salvatore

[11] 3,738,355
[45] June 12, 1973

[54] BONE GAGE

[76] Inventor: Joseph E. Salvatore, 200 Engle St., Englewood, N.J. 07631

[22] Filed: Aug. 5, 1971

[21] Appl. No.: 169,301

[52] U.S. Cl. ............ 128/2 S, 33/143 C, 33/174 D, 128/303
[51] Int. Cl. ................................................ A61b 5/10
[58] Field of Search .................. 128/2 S, 2 R, 303; 33/143 C, 143 R, 143 J, 174 D, 141 G

[56] References Cited
UNITED STATES PATENTS

| | | | |
|---|---|---|---|
| 2,470,498 | 5/1949 | Lankford | 33/143 R |
| 512,025 | 1/1894 | Haviland | 33/174 D X |
| 2,894,328 | 7/1959 | Wojcik | 33/143 R X |
| 3,101,551 | 8/1963 | Bryant | 33/143 R X |
| 3,038,259 | 6/1962 | Smialowski | 33/143 R X |
| 3,604,487 | 9/1971 | Gilbert | 128/303 X |

FOREIGN PATENTS OR APPLICATIONS

| | | | |
|---|---|---|---|
| 418,655 | 2/1967 | Switzerland | 33/143 R |

Primary Examiner—Kyle L. Howell
Attorney—Philip G. Hilbert

[57] ABSTRACT

A bone gage for measuring the thickness or diameter of a bone. The bone gage comprises a body having mounted thereon extended wire hooks formed with jaws which are adapted to be extended through a hole formed in the bone structure, and which spring between open and closed position to engage and disengage the distal edge of the bone to be gaged. A measuring sleeve is operatively associated with the body so as to be freely slidable relative to the body, toward and away from the bone to be measured, when the jaws are biased opened and which is frictionally secured or locked to the body when the jaws are biased to a closed position. A scale is operatively associated with the measuring sleeve to measure the distance or displacement between the jaws and the adjacent end of the sleeve to determine the bone diameter disposed therebetween.

13 Claims, 12 Drawing Figures

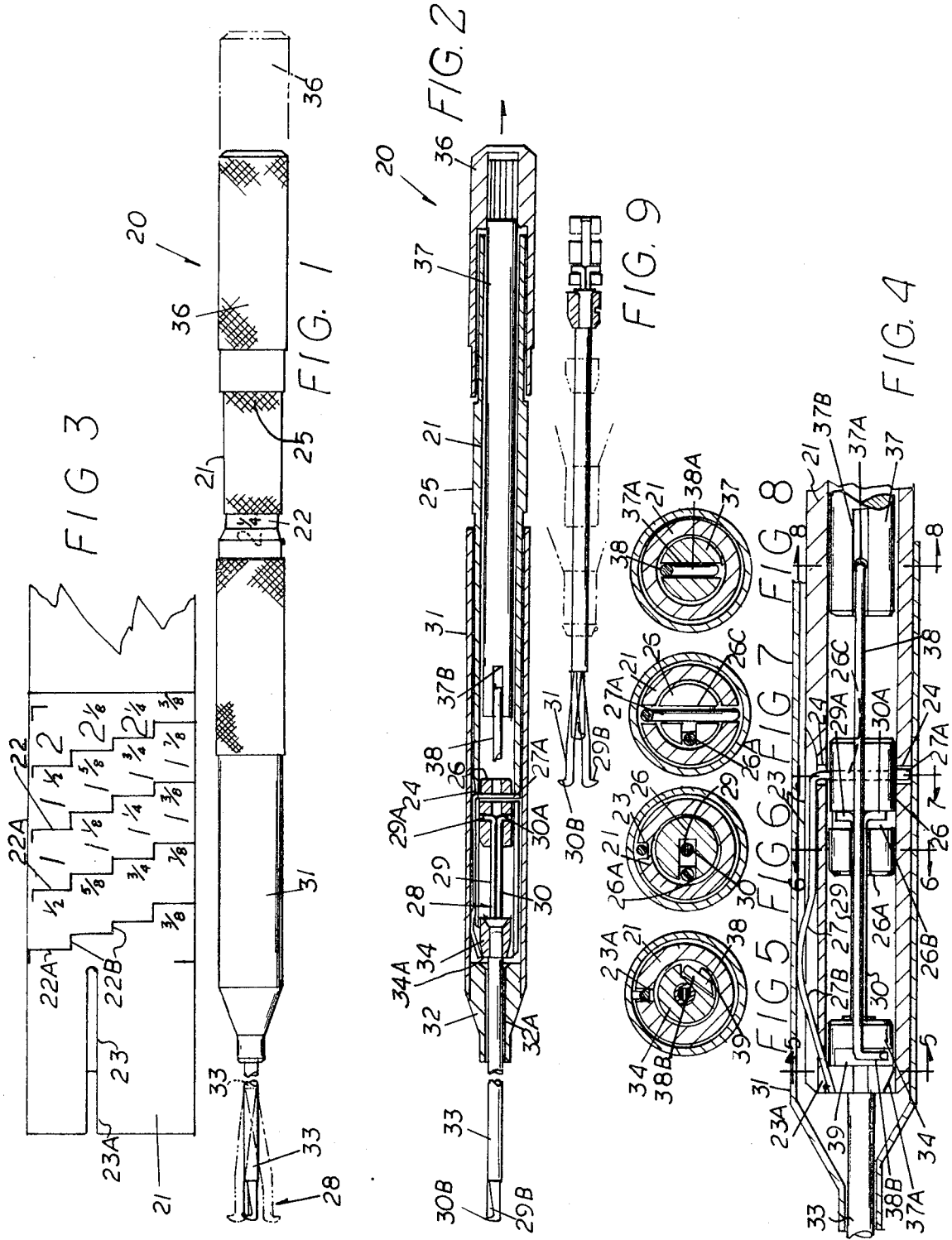

BONE GAGE

PROBLEM

In bone surgery and/or in setting broken bones it is frequently required that a pin or screw be inserted through the bone to secure and/or join adjacent bone sections or fragments together. During such operative procedures it is essential that the surgeon determine as quickly and accurately as possible, the precise bone diameter or thickness so that the proper sized pin or screw may be selected to effect the remedy. Heretofore surgeons encountered considerable difficulty in ascertaining the precise dimension of the bone, and consequently the selection of the appropriate pin or screw length required for the particular operation. For this reason the most optimum pin or screw length was not always selected.

OBJECTS

It is therefore an object of this invention to provide a bone gage by which an operating surgeon can precisely determine the size or thickness of a patient's bone to be repaired or pinned so that the proper size pin can be selected for obtaining optimum results.

It is another object of this invention to provide a bone gage which can be readily handled by a surgeon during an operative procedure which will permit an accurate measurement to be made of the bone diameter or thickness.

Another object of this invention is to provide a bone gage which can be readily operated in a manner which permits the measurement to be positively maintained as the instrument is removed from the patient so that the necessary reading may be made.

Another object of this invention is to provide a bone gage in which the component parts of the instrument may be readily set during an operative procedure and which setting can be maintained as the instrument is removed from the patient so that the necessary reading may be made.

Another object is to provide a bone gage with an improved scale for easy read-out.

SUMMARY OF INVENTION

The foregoing objects, and other features and advantages of this invention, are attained by a bone gage comprising a tubular body portion having connected thereto extended wire hook means terminating in oppositely disposed jaws which are adapted to spring between open and closed position. Mounted on the tubular body is a measuring sleeve which is free to slide longitudinally along the axis of the body. A scale means is provided on the tubular body which is operatively associated with the measuring sleeve to gage the size or diameter of a bone imposed between the jaws and the adjacent end of the sleeve. The hook means are preferably defined by a pair of spring wires extending beyond the tubular body terminating in laterally disposed jaws. The respective spring wires are formed so that the jaws are normally biased toward an open position. In operation, the elongated wires with their jaw ends compressed or closed are adapted to extend through a bore or opening formed in the bone structure to be measured, whereupon the jaws are permitted to open to engage the distal edge of the bone. The operation of the jaws is effected by a tubular sheathing slidably disposed over the wires. The tubular sheathing is adapted to be moved between an extended and retracted position relative to the tubular body; the arrangement being such that the sheathing tube, in the extended position thereof, biases the jaws to the closed position to permit insertion and retraction of the gage from the bore formed in the bone. In the retracted position of the sheathing tube, the jaws normally spring to open position.

A locking means is arranged to frictionally secure the measuring sleeve to the body whenever the jaws are normally biased to the closed position and to render the measuring sleeve freely slidable relative to the tubular body when the jaws are in open position.

Control of the jaws and associated locking means is attained by an operator mounted on the end of the tubular body which is operatively connected to the sheathing to render the jaws and locking means responsive to the operation thereof. The construction of the bone gage is such that a surgeon can effect the operation thereof with one hand. To facilitate read-out, a scale means is provided about the tubular body, the increments of which are rendered readily discernable by displacement of the measuring sleeve relative to the tubular body.

FEATURES

A feature of this invention resides in the provision of a bone gage having expandible jaws movable between open and closed position to provide for insertion and a positive engagement of the bone gage with the distal edge of the bone.

Another feature of this invention resides in the provision of a bone gage having the measuring sleeve rendered freely movable along the tubular body when the bone gage is disposed in operative position, and which measuring sleeve is automatically locked in the set or gaged position to the tubular body upon removal of the bone gage from the bone being measured.

Another feature of this invention resides in the provision of a bone gage having an improved expanded scale constructed and arranged so as to provide for an easy read-out.

Another feature of the invention resides in the provision of a bone gage which is relatively simple in construction and assembly so as to render it completely servicable without the use of any tools.

Another feature of this invention resides in the provision of a bone gage having extended wire hook means which when closed can be readily inserted through an opening formed in the bone to be measured and which can then be readily expanded in situ to an open position to effect positive engagement of the hook means to the distal edge of the bone.

Another feature of this invention resides in a bone gage having an actuating means formed on the end of the gage to control the opening and closing of the hook means and the locking and unlocking of the measuring sleeve in a simple and expedient manner.

Other features and advantages will become more readily apparent when considered in view of the drawings in which:

FIG. 1 is a side elevation view of a bone gage embodying the present invention.

FIG. 2 is a cross sectional view of the bone gage of FIG. 1.

FIG. 3 is a an enlarged fragmented, expanded detail of the scale means formed on the tubular body of the bone gage of FIGS. 1 and 2.

FIG. 4 is an enlarged detail of the front end section of the bone gage with the measuring sleeve removed.

FIG. 5 is a cross sectional view taken along line 5—5 on FIG. 4.

FIG. 6 is a sectional view taken along line 6—6 on FIG. 4.

FIG. 7 is a cross sectional view taken along lines 7—7 on FIG. 4.

FIG. 8 is a cross sectional view taken along line 8—8 on FIG. 4.

FIG. 9 is a fragmentary view of the bone gage hook means whereon the solid line showing illustrates the hook means in an open position.

DESCRIPTION OF THE PREFERRED EMBODIMENT

Figure 10:
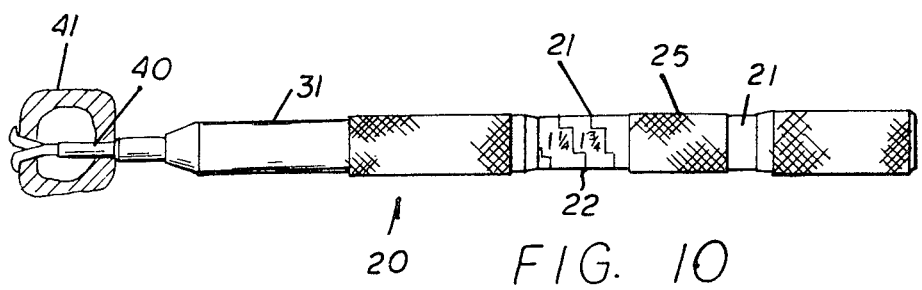
FIG. 10 is a view illustrating the manner in which the bone gage is applied to a bone to be gaged.

Referring to the drawings there is shown in FIGS. 1, 2 and 10 a bone gage 20 embodying the present invention. In surgery requiring bone repair and/or restructuring of injured bones it is frequently necessary that adjacent bone structures be pinned or screwed together to effect the necessary repair. For this reason it is imperative that a surgeon be able to precisely determine quickly and accurately the thickness or diameter of a given bone so that the required pin or screw size may be selected for optimum results.

The bone gage 20 illustrated in FIGS. 1, 2 and 10 will enable a surgeon to quickly determine the bone dimension. It comprises a tubular body 21 on which there is formed indicia means to define a scale 22 which is readable in predetermined unit lengths. In FIG. 3 the scale 22 is illustrated in expanded form, and it is suitably scribed about the outer circumferential surface portion of the tubular body intermediate the ends thereof. The scale 22 comprises a series of scribed, stepped indices or markings 22A wherein each step 22B is calibrated to a given unit length, as for example, in units of one-eighth inch. To the right of each stepped unit 22B there is scribed the corresponding unit length. The illustrated scale ranges from ⅜ inch to 2 ⅜ inches.

The tubular body 21 comprises essentially a tubular member open at each end. A longitudinally extending groove 23 is formed adjacent the front end of the body 21. As best seen in FIG. 3 a portion 23A of the groove 23 extends or cuts through the thickness of the body material. A transversely extending opening 24 is disposed in communication with the rear end of the groove 23, as best seen in FIG. 4. As noted, the opening 24 extends through the opposed circumferential portions of the tubular body 21.

The scale 22, described, is disposed along an intermediate portion of the tubular body 21. If desired, a portion of the body 21 is knurled as at 25 to provide a friction surface to facilitate handling.

Disposed within the body 21 is a connector 26 in the form of a rod segment. The connector 26 is formed with longitudinally extending groove 26A and transversely extending groove 26B. The connector 26 is also provided with a transversely extending bore 26C which is adapted to be disposed in alignment with the openings 24—24 formed in the tubular body. As will be hereinafter described, the connector 26 is fixedly retained within the body 21 by a drag spring 27 which has a laterally bent end portion 27A which is adapted to be inserted into opening 24 and the aligned bore 26C formed in the connector 26.

Figure 11:
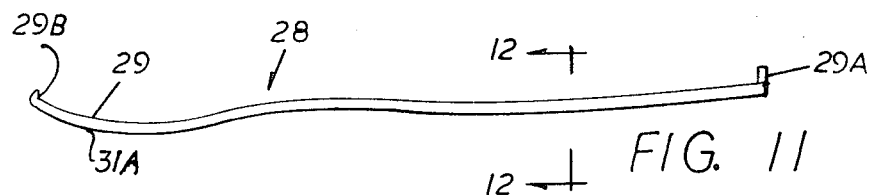
FIG. 11 is a detailed side view of the wire defining the hook means.
Figure 12:
FIG. 12 is a sectional view taken along line 12—12 on FIG. 11.

Anchored to the connector 26 are hook means 28 which extend forwardly through the open end of the body 21. As best seen in FIGS. 1 and 2 the hook means 28 comprises a pair of longitudinally extending wires 29 and 30 which are similar in construction. As noted in FIG. 11 the inner end portion 29A, 30A of each wire 29, 30 is laterally bent to engage in the transverse slot 26B of the connector 26, with the adjacent longitudinal extending portion of the wires 29, 30 extending along the longitudinally extending groove 26A. As seen in FIGS. 2 and 4 the hook wires 29, 30 extend forwardly and beyond the tubular body 21 terminating in a laterally turned jaw end 29B, 30B. The hook wires are preferably formed of half round spring wire, (See FIG. 12.) wherein the extended portion is provided with a slight bend as at 31A as best seen in FIG. 11 so as to impart to the extended end of the respective wires 29, 30 a biasing or spring force which will normally tend to urge jaw ends 29B, 30B toward open position as indicated in FIG. 9.

Slidably mounted in telescoping relationship on the forward end of the tubular body 21 is a measuring sleeve 31. As best seen in FIG. 2 the measuring sleeve 31 is provided at its forward end with a guide portion 32 formed with a bore 32A extending therethrough, through which a sheathing tube 33 extends. The sheathing tube in turn encases the extended ends of the hook wires 29 and 30.

The measuring sleeve is slidably disposed relative to the tubular body 21 for effecting relative longitudinal displacement therebetween. In operation the rear end of the measuring sleeve 31 is disposed adjacent the scale means 22 to form the indicator for effecting the reading of the scale. Thus the scale indicia 22A nearest the end of the tubualr sleeve determines the reading.

The sheathing tube 33 is slidably disposed about the hook wires so that it can be actuated between a projected position, as shown in the solid line showing of FIG. 1, and a retracted position as shown in FIG. 9. In the extended position the leading end of the sheathing tube 33 will effect a cam action on portions 31A of the hook wires to compress or urge the jaws 29B and 30B to a closed or compressed position. In the retracted position the sheathing tube permits the inherent resiliency of the hook wires to normally urge the jaws to a spread or open position. Thus whenever the sheathing tube 33 is extended to its protracted position, the jaws are compressed to closed position as indicated in the solid line showings of FIGS. 1 and 2. Actuating means which include the sheathing tube 33 are provided to facilitate the opening and closing of the jaws 29B, 30B. Connected to the inner end of the sheathing tube 33 is a tube head 34 which is disposed within the leading end of the tubular body. As best seen in FIG. 2 the tubular head 34 is provided with a leading frustoconical portion to define an inclined cam surface 34A.

In the extended or protracted position of the tube head and associated sheathing tube, as seen in FIG. 4, the cam surface 34A of the tube head bears against the leading end of the drag spring 27 causing the latter to be cammed outwardly of the tube body. The previously described drag spring has a longitudinally extending portion adapted to seat in groove 23 with the forward end thereof extending through the cut-through portion 23A of the groove to engage the cam surface 34A of the tube head 34. An intermediate portion 27B of the drag spring is outwardly bent to engage the inner periphery of the measuring sleeve 31 to impart a friction holding force thereon. Thus as seen in FIG. 2, the measuring sleeve 31 is frictionally secured or held fast relative to the body 21 whenever the sheathing tube 33 is extended to compress the jaws 29B, 30B.

To effect operation or displacement of the jaws between open and closed position, an operator in the form of a closure head 36 is slidably mounted on the end of the tubular body 25. Connected to the closure head 36 is a push rod 37 which extends inwardly of the tubular body 21. The push rod 37 is provided with a transversely extending bore 37A communicating with a longitudinally extending slot 37B formed on the inner end thereof. The pusher rod 37 in turn is operatively connected to the tubuular head 34 of the sheathing tube 33 by means of a connecting rod 38.

As best seen in FIG. 4 the connecting rod 38 comprises a longitudinally extending wire having opposed bent end portions 38A, 38B, with end portions 38A being received in the transverse opening 37A formed in the end of the pusher rod 37 and with end portion 38B received in a complementary notch 39 formed in the side of the tubular head 34. Accordingly, it will be readily noted as best seen in FIGS. 2 and 4, that displacement of the closure head 36 relative to the tubular body 21 will effect corresponding reciprocation or displacement of the sheathing tube 33 and connected tubular head 34. Thus as best seen in FIG. 2, whenever the closure member 36 is moved to the right, or the phantom line showing, the push rod 37 and connected sheathing tube 33 is displaced to the right causing the sheathing tube 33 to unsheath the hook wire to permit the inherent resiliency thereof to normally extend the jaws to an open position as indicated in FIG. 9. When the closure head 36 is repositioned to the left, as indicated by the solid line showing in FIG. 2, the sheathing tube 33 is protracted as indicated in FIGS. 1 and 2 causing the forward end of the sheathing tube 33 to compress the hook wires to force the jaws to closed position.

When the sheathing tube is protracted the tube head 34 cams the drag spring 27 outwardly, and it functions as a locking means whereby the measuring tube 31 is secured or held fast to the body 21 whenever the jaws 29B, 30B are compressed. As the longitudinally extending portion 27B of the drag spring 27 is cantilever in camming relationship with the cam surface of the tubular head, the drag spring 27 will release the measuring tube 31 whenever the tube head 34 is retracted, as the spring 27 will be displaced inwardly an amount sufficient to permit the tube 31 to slide relative to the body 21. Accordingly in the position shown in FIG. 4 it will be understood that the bent portion 27B of the drag spring 27 frictionally engages with the circumscribing measuring sleeve, as indicated in FIG. 2, to maintain it in frictional locked position whenever the jaws 29B, 30 are in the closed position as indicated.

In the construction described it will be readily apparent that the drag spring 27 defines the means by which the entire gage 20 may be held in assembled position. As best seen in FIG. 2, it will be noted that the longitudinally extending bore 32A in the guide end 32 of sleeve 31 is provided with a diameter by which the sleeve 31 is free to pass over the jaw ends 29B, 30B of the hook wires when the jaws are compressed to a closed position as indicated in FIG. 2. Thus to effect disassembly of the gage 20, the measuring sleeve 31, by an application of force sufficient to overcome the friction of the lock means 27, can be readily separated from the tubular body 21 by sliding the same over the closed jaws 29B, 30B of the hook means. The removal of the measuring sleeve 31 thus exposes the locking spring 27, which may then be readily removed by unseating the bent end 27A from the tubular body 21. The unseating of the bent end 27A of the lock spring 27 permits the closure head 36, associated push rod 37, connector 26, together with the hook means 29, 30 and enclosing sheathing means 33 to be pulled free of the tubular body 21 by displacement to the right as best seen in FIG. 3. Separation of the wire ends 29A, 30A from their connectors 26 can then be readily effected simply by disengaging the turned ends 29A of the hook wires, from the connector groove 26B. The push rod 37 can be readily separated from the tubular head 34 by disengagement of the connector wire 38 from bore 37A and notch 39. To effect reassembly of the tool 20, the reverse procedure is followed.

In operation, to utilize the bone gage 20 described, a surgeon first forms a transverse hole or bore 40 in the patient's bone 41 to be gaged. Upon completion of the bone bore 30, the surgeon, with the bone gaged jaws 29B, 30B closed, extends the wires and enclosing sheathing tube through the bored hole 40 as indicated in FIG. 10. With the end of the gage extended completely through the bone 41, the surgeon actuates the closure head 30 by a pull to the right, as indicated in FIGS. 2 and 10, so as to effect retraction of the sheathing tube 33, thus permitting the jaws to spring to open position. With the open jaws 29B, 30B disposed in firm engagement with the distal side of the bone 41, the measuring sleeve is moved until the forward or guide end engages the opposite side of the bone. The displacement of the measuring sleeve 31 thus exposes the scale so that a reading may be attained. The scale is thus calibrated so as to indicate the distance between the jaws and the guide end 32 of the sleeve 31.

To effect removal of the bone gage 20 from the patient the surgeon depresses the closure means 36, causing the sheathing tube 33 to be extended to protracted position. In doing so the sheathing tube effects the camming of the wire hooks to compressed position as the tube head 34 cams the lock spring to frictionally secure the measuring sleeve in the set position. With the measuring sleeve 31 thus locked relative to the tubular body 21, and with the jaws compressed to a closed position, the bone gage 20 can be readily removed from the patient. As the measuring sleeve is secured to the body 21 in the gage position, the surgeon can then ascertain the diameter of the bone by effecting a direct reading of the scale. The indicia nearest to the edge of the sleeve indicates the pin size necessary to traverse the bone measured by the instrument.

From the foregoing it will be apparent that the bone gage 20 comprises a relatively simple structure that can be readily assembled and disassembled without the requirement of any hand tool. Also the arrangement is such that the measuring sleeve 31 is readily locked to the tubular body 21 in the gaged position as the instrument is removed from the patient so that the gaged distance is not disturbed. Also the scale means is such that an accurate and easy read-out may be had upon completion of the gaging operation.

While the present invention has been described with respect to a particular embodiment thereof it will be readily appreciated and understood that variations and modifications may be made without departing from the spirit or scope of the invention.

What is claimed is:

1. A bone gage comprising: means defining a tubular body,
hook means connected to and extending longitudinally outwardly from said body and adapted to move between operative and inoperative positions,
a measuring sleeve slidably mounted on said body means for relative movement with respect thereto,
a scale means operatively associated with said measuring sleeve to measure the amount of relative movement between said sleeve and said body means,
locking means for locking and unlocking said measuring sleeve to said body means, and
actuating means mounted on said body operatively connected with said hook means providing means whereby said measuring sleeve is locked relative to said body means when said actuating means is operated to render said hook means inoperative, and said measuring sleeve being unlocked and free to slide relative to said body means when said actuating means is actuated to render said hook means operative,
said hook means comprising a pair of elongated wires adapted to extend through an opening formed in a bone,
jaw means connected to the extended end of said wires,
said jaws being normally biased and adapted to positively engage said jaws on the distal edge of said bone,
and said actuating means including a sheathing tube means slidably disposed over said wires for movement between extended and retracted positions relative to said body means providing means whereby said sheathing tube in the extended position biases said jaws toward closed position to permit retraction of said gage from the bone.

2. The invention as defined in claim 1 wherein said locking means includes a drag cam mounted on the tubular body providing means for frictionally maintaining said measuring sleeve secured to said body meanS in the extended position of said sheathing tube.

3. The invention as defined in claim 2 wherein said measuring sleeve includes a guide end slidably disposed on said sheathing tube means wherein said guide end is adapted to be moved into engagement with the opposed side of a bone whereby the distance between the jaws and said guide end determines the diameter of a given bone.

4. The invention as defined in claim 3 wherein said sheathing tube means includes a tube head having a camming surface providing means to effect a camming action on said drag cam in the extended position thereof.

5. The invention as defined in claim 4 wherein said actuating means includes:
a closure head mounted on the end of said body,
a push rod connected to said closure head arranged to extend into said body,
and a connector interconnecting said push rod with said sheathing tube means whereby the displacement of said sheathing tube means is rendered responsive to the movement of said closure head.

6. A bone gage comprising:
means defining a body,
hook means connected to and extending longitudinally outwardly from said body and adapted to move between operative and inoperative positions,
a measuring sleeve slidably mounted on said body means for relative movement with respect thereto,
a scale means operatively associated with said measuring sleeve to measure the amount of relative movement between said sleeve and said body means,
locking means for locking and unlocking said measuring sleeve to said body means,
and actuating means mounted on said body operatively connected with said hook means providing means whereby said measuring sleeve is locked relative to said body means when said actuating means is operated to render said hook means inoperative and said measuring sleeve being unlocked and free to slide relative to said body means when said actuating means is actuated to render said hook means operative,
said hook means comprising a pair of elongated wires adapted to extend through an opening formed in a bone,
jaw means connected to the extended end of said wires,
said jaws being normally biased and adapted to positively engage said jaws on the distal edge of said bone,
said actuating means including a sheathing tube means slidably disposed over said wires for movement between extended and retracted positions relative to said body means providing means whereby said sheathing tube biases said jaws toward closed position to permit retraction of said gage from the bone,
said locking means including a drag cam mounted on the body forming means for frictionally maintaining said measuring sleeve secured to said body in the extended position of said sheathing tube,
and said measuring sleeve including a guide end slidably disposed on said sheathing tube means wherein said guide end is adapted to be moved into engagement with the opposed side of a bone whereby the distance between the jaws and said guide end determines the diameter of a given bone,
and said sheathing tube means includes a tube head having a camming surface forming means to effect a camming action on said drag cam in the extended position thereof, and
said actuating means includes a closure head slidably disposed on the end of said body means,
and means interconnecting said closure head with said sheathing tube means.

7. A bone gage adapted to extend through a transverse hole formed in a bone for measuring the diameter of the bone comprising:

a tubular body, hook means, means connecting said hook means to said body so that an end portion of said hook means extends beyond one end of said body, said hook means including a pair of spring wires each having a laterally turned jaw on the extended end thereof, said spring wires being normally biased so that said jaws are extended, a measuring sleeve having indicia thereon to define a scale, said measuring sleeve telescopically disposed on said body for relative movement with respect thereto, a guide connected to one end of said measuring sleeve through which said hook wires extend, a sheathing tube encasing a major length of said extended hook wires, said sheathing tube being extended through the guide end of said sleeve, a tube head having a cam surface connected to the inner end of said sheathing tube, a drag spring mounted on said body, said drag spring have a bent end portion adapted to follow the cam surface of said tube head, said bent end portion being disposed between said body and said measuring sleeve, and said spring having an intermediate drag portion to engage said measuring sleeve to frictionally secure said measuring sleeve to said tubular body when said drag spring is rendered operative, and actuating means movable relative to said body and operatively associated with said drag spring to render said drag spring operative to lock said sleeve to said tubular body when said jaws are biased to closed position and to unlock said sleeve relative to said body when said jaws are biased to open position.

8. The invention as defined in claim 7 wherein said actuating means includes:

a closure head movably mounted on the end of said body, a push rod connected to said closure head and extending through said body, means interconnecting said tube head with said push rod whereby the movement of said tube head and connected sheathing tube is rendered responsive to the movement of said closure head.

9. The invention defined in claim 7 wherein said means connecting said hook means to said body includes: a connector disposed within said body, said connector having a first groove formed therein and a second groove, said hook wires having a laterally turned end received in said second groove of said connector, said connector having a bore therein, and said body having opposed openings formed therein aligned with the bore of said connector, and said drag spring having a bent inner end portion extending through the aligned openings in said body and bore of said connector to fixedly secure the connector in position in said tubular body.

10. A bone gage comprising:

a tubular body, a measuring sleeve telescopically mounted on said body for relative sliding movement with respect to said body, hook means connected to said body and extending beyond the ends of said body and telescoping sleeve, said hook means having jaws adapted to move between open and closed position, said jaws being normally biased toward open position, an actuating means on said body operatively associated with said jaws for effecting the opening and closing of said jaws, and means on said body for frictionally locking said sleeve to said body and forming means whereby said sleeve is locked to said body when the jaws are closed and free to slide relative to said body when said jaws are open.

11. A bone gage comprising:

a tubular body, a measuring sleeve telescopically mounted on said body for relative movement, hook means extending beyond the ends of said body and sleeve, said hook means having jaws adapted to move between open and closed position, an actuating means operatively associated with said jaws for effecting the opening and closing of said jaws, and means for locking said sleeve to said body and forming means whereby said sleeve is locked to said body when the jaws are closed and free to slide relative to said body when said jaws are open, wherein said actuating means includes a closure head movably mounted on the end of said body, a sheathing tube projecting from said body and slidably disposed relative to said hook means to extend between a protracted and retracted position, and means interconnecting said sheathing tube with said closure head whereby the protracting and retracting of said sheathing tube is responsive to the movement of said closure head.

12. The invention as defined in claim 11 wherein said hook means comprises a pair of spring wires, said jaws being connected to the extended end of said wires whereby said jaws are normally spring urged toward open position, and said sheathing tube in the extended position thereof effects a biasing of said jaws to closed position.

13. The invention as defined in claim 11 wherein said locking means includes:

a drag spring mounted on said body, and disposed between said body and said sleeve, and cam means operatively associated with said sheathing tube to provide means effecting a camming of said drag spring into locking and unlocking position of said sleeve relative to said body as said sheathing tube is protracted and retracted accordingly.

* * * * *